July 19, 1938.    C. E. FERREE ET AL    2,124,229
CENTRAL VISION SCOTOMETER
Filed March 28, 1935

CLARENCE ERROL FERREE
GERTRUDE RAND FERREE
INVENTORS

BY *G.A. Ellestad*
ATTORNEY

Patented July 19, 1938

2,124,229

UNITED STATES PATENT OFFICE 2,124,229

CENTRAL VISION SCOTOMETER

Clarence Errol Ferree and Gertrude Rand Ferree, Baltimore, Md.

Application March 28, 1935, Serial No. 13,430

7 Claims. (Cl. 88—20)

The present invention relates to eye testing and more particularly to a method and apparatus for testing for central scotomas.

The mapping, and even the detection of small central scotomas, is one of the outstanding problems of scotometry. Heretofore such defects were found mainly by a process of elimination and the results were often uncertain and inaccurate. Long and careful tests with a tangent screen, Haitz chart or the like sometimes fail entirely to reveal the presence of small central scotomas. Up to the present time there has been no test for accurately and rapidly detecting the presence of a central scotoma and for making a rough determination of its size.

One of the objects of the present invention is to provide a method and apparatus for testing for central scotomas. Another object is to provide a method and apparatus for making a quick examination for central scotoma and a rough determination of its size. Another object is to provide a method and apparatus for eye testing in which the stimulus from a restricted portion of a test field is changed without the formation of an after-image. A further object is to provide a method and apparatus for eye testing in which the color stimulus from a restricted portion of a test field is changed without changing the brightness stimulus from said portion. These and other objects and advantages reside in certain novel features of combination and arrangement of parts and processes as will hereinafter be more fully set forth and pointed out in the appended claims.

Referring to the drawing.

Figure 1:
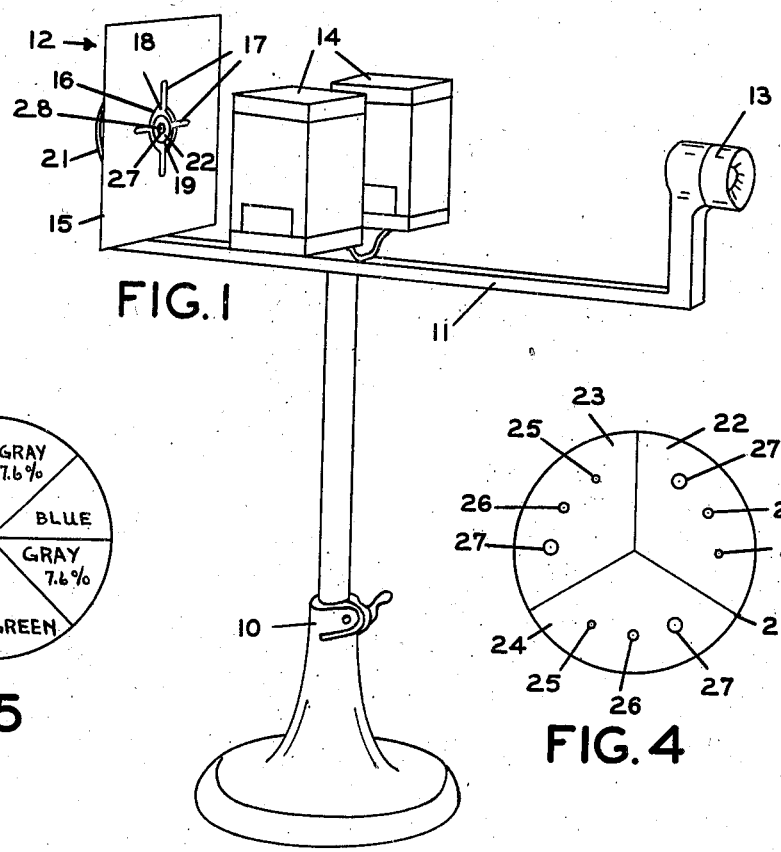
Fig. 1 is a perspective view of an apparatus embodying our invention.
Figure 5:
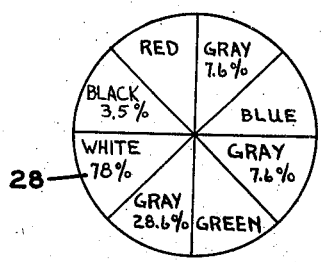
Fig. 5 is a front elevation of the color disk.
Figure 4:
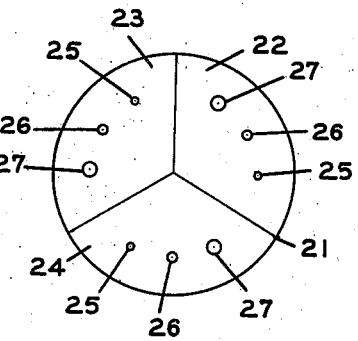
Fig. 4 is a front elevation of the aperture disk.
Figure 2:
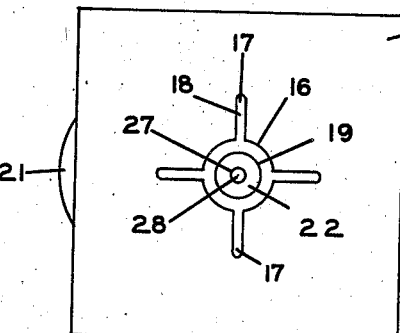
Fig. 2 is a front elevation of the test object.
Figure 3:
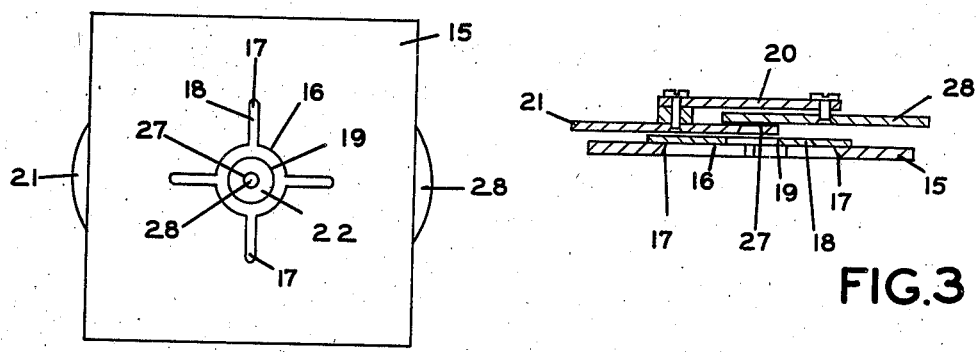
Fig. 3 is a horizontal section through the test object.

An apparatus embodying this invention is illustrated in the drawing wherein 10 indicates a base upon which is carried a support 11 having a test object 12 at one end and an eyepiece 13 at the other. The eyepiece 13 is provided with a pupillary aperture of a size found to be of optimum service in eliminating errors of refraction and in giving a high acuity. Two lamp houses 14, also carried by the support 11, contain lamps for suitably illuminating the test object 12. The lamp houses 14 are carefully light-proofed and are provided with etched daylight filters for color correction and with neutral filters for gross control of intensity. The front plate 15 of the test object 12, the lamp houses 14 and the support 11 are painted a neutral gray.

The front plate 15 is formed with a central circular aperture 16 and four radially disposed slots 17 extending outwardly from said aperture. A preferably white disk 18 having a circular aperture 19 is carried by the plate 15 back of the aperture 16 with the apertures 16 and 19 concentric. The resultant form of a combination circle and broken cross forms an effective control of fixation even though a central scotoma is present. In making the examination the patient is instructed to look at the center of the circle at the point of intersection of the radial lines and the device serves to guide and control fixation by establishing well marked lines of direction which intersect at the center of the test field.

Mounted upon the support 11 to the rear of the plate 15 and disk 18 is a bracket 20 upon which a disk 21 is rotatably mounted. This disk 21 is divided into three sectors 22, 23 and 24 each provided with three apertures 25, 26 and 27 adapted to be moved selectively into alignment with the apertures 16 and 19. In one embodiment of this invention the size of these apertures are such that they subtend angles at the eye in the ratio 1:2:4 in each sector. The disk 21 is formed with nine shallow cups, not shown, one for each aperture, and the bracket 20 is provided with a spring pressed ball, not shown, for engagement with said cups so as to stop the disk 21 when one of its apertures is in alignment with the apertures 16 and 19.

Also rotatably mounted upon the bracket 20 to the rear of the disk 21 is another disk 28 which is divided into eight equal sectors. The disk 28 is formed with eight shallow cups, not shown, one for each sector, and the bracket 20 is provided with a second spring pressed ball, not shown, for engagement with the cups on disk 28 to stop the disk when one of the sectors is in alignment with the apertures 16 and 19 and an aperture in disk 21.

The eight equal sectors of the disk 28 are surfaced with especially prepared paints and pigment papers in the following order: black (coefficient of reflection 3.5 per cent); white (coefficient of reflection 78 per cent); gray of the approximate brightness of the green of the Heidelberg papers (coefficient of reflection 28.6 per cent); the green of the Heidelberg papers; gray of the approximate brightness of the blue of the Heidelberg papers (coefficient of reflection 7.6 per cent); the blue of the Heidelberg papers;

gray of the approximate brightness of the red of the Heidelberg papers (coefficient of reflection 7.6 per cent), and the red of the Heidelberg papers. The grays are approximately of the brightness of the colors when viewed through the small aperture used in the eyepiece. The disk 28 is arranged in the manner described, so that when it is rotated the form and color stimuli selected for the examination will be presented in a given prescribed order, each preceded by its correct preexposure. That is, the white, green, blue and red sectors serve as stimuli; the grays, respectively, of the brightness of the green, blue and red stimuli as preexposures for these stimuli; and the black as a preexposure for the white stimulus. As the grays are approximately of the same brightness as the colors, when there is a scotoma for color, the stimulus tends to disappear completely and the background to be seen as uniformly gray.

The three sectors 22, 23 and 24 of the disk 21 are surfaced with gray of the approximate brightness of red and blue of the Heidelberg papers (coefficient of reflection 7.6 percent); gray of the brightness of the green of the Heidelberg papers (coefficient of reflection 28.6 percent), and black (coefficient of reflection 3.5 per cent) respectively. The diameters of the three apertures 25, 26 and 27 in each sector are such that the angles subtended at the eye are 0.25, 0.5 and 1.0 degree respectively, thus giving stimuli which fall within the fovea of the eye. The front plate 15, the lamp houses 14 and the support 11 are surfaced with the darker of the two grays used, the coefficient of reflection being 7.6 per cent.

The purpose of the disk 28 is to provide a conveniently operable device for the presentation of the color and form stimuli selected for the examination, the preexposures needed for these stimuli and the blank surfaces for an objective check on the judgment. The disk 21 provides a background on which the stimulus is to be viewed and the control of the brightness of the more immediately surrounding field, and contains the apertures 25, 26 and 27 needed for the gradation of the size of the stimulus. The stationary front plate provides control of the brightness of the more remote surrounding field and contains the device for the control of fixation.

By means of these devices it is possible:

(1) To present foveal stimuli of a great variety of visibilities, color and form, e. g., red, blue or green on a gray of the brightness of the color; white on a background of black, gray of the brightness of red and blue, or gray of the brightness of green; gray of the brightness of green on a background of black or gray of the brightness of red and blue, and gray of the brightness of red and blue on a background of black, or of gray of the brightness of green. Stimuli of a great variety of visibilities, color and form are thus made available and there is provided for each colored stimulus a background of the brightness of the color, and for each form stimulus, a background of black or of grays of the brightness of the colors.

(2) To provide for each colored stimulus a preexposure of the brightness of the color, and for each form stimulus, a preexposure of the brightness of the background, the sector serving as preexposure, for convenience of operation, being made to precede, in the order of rotation of the disk, the sector that serves as a stimulus.

(3) To present each stimulus in three sizes subtending at the eye angles of 0.25, 0.5 and 1 degree.

(4) To present at will, as the substitute for any stimulus a neutral surface of the brightness of the surrounding field to serve as a blank for an objective check on the correctness of the judgment.

In the operation and use of this apparatus, and the practice of this method, the patient looks through the eyepiece 13 and fixes his vision on the center of the test object. By moving the disk 28, the color of the center of the test object can be changed without changing the brightness or the brightness of the center of the test object can be changed without the introduction of color. Thus, when there is a central scotoma for either color or form or both, either the color change or the brightness change or both will be imperceptible. The apertures 25, 26 and 27 give a rough determination of the size of the scotoma.

It will be apparent that by the use of the stimuli and preexposures named, any disturbing effects of simultaneous or successive contrast will be avoided. In the use of the black and the white sectors, the after image of the white will be black and vice versa so that it will not detract from the succeeding stimulus. In the case of the colors with their preexposures, the brightness of the color and its preexposure are the same and the neutral gray preexposure does not cause an after image changing either the hue or saturation of the color. Thus the stimulus may be changed either as to color or form without the preexposure affecting the characteristics of the succeeding stimulus.

From the foregoing it will be apparent that we are able to attain the objects of our invention and provide a method and apparatus for making a quick examination for central scotoma and a rough approximation of its size. The specific details of construction set forth are by way of illustration and not by way of limitation. Various modifications can, of course, be made without departing from the spirit of our invention or the scope of the appended claims.

We claim:

1. In an apparatus of the character described, a test object comprising an apertured plate of neutral gray shade, means for guiding fixation toward the aperture in said plate, a second plate movably mounted behind said first plate, a colored section on said second plate, a neutral gray section on said second plate, said gray section giving the same brightness stimulus as said colored section, and means for moving said second plate to selectively bring either section into alignment with the aperture in said apertured plate.

2. In an apparatus of the character described, a test object comprising an apertured plate of neutral gray shade, means for directing fixation toward the aperture in said plate, a second plate movably mounted behind said first plate, a colored section on said second plate, a neutral gray section on said second plate, said gray section giving the same brightness stimulus as said colored section, means for moving said second plate to selectively bring either section into alignment with the aperture in said apertured plate, an eyepiece in alignment with said aperture, and means for illuminating said test object.

3. An apparatus of the character described comprising a support, a plate of a neutral shade having a certain brightness and having a plurality of apertures of different sizes movably mounted on said support, a second plate movably mounted on said support, said second plate having a colored portion of the same brightness as said first plate and a neutral portion of the same brightness as said colored portion, means for selectively moving said second plate so as to bring one or the other of said portions into a selected position means for selectively moving said first plate so as to bring any one of said apertures into alignment with said position, and means for directing the eye of a patient toward said position.

4. In an apparatus of the character described, a first neutral gray plate having an aperture therein, means for guiding fixation toward the center of said aperture, two plates movably mounted in overlapping relation at the rear of said first plate, the front one of said two plates being of neutral gray and having a series of apertures of different size concentric with the aperture in said first plate, means for moving said front one of said two plates to place one of said apertures in alignment with the aperture in said first plate, said rear one of said two plates having a colored section and a gray section giving the same brightness stimulus as said colored section, and means for selectively moving said rear one of said two plates to bring one or the other of said sections into alignment with said apertures.

5. An apparatus for testing central scotoma comprising a neutral background, a fixation object for directing the eye of a patient toward a point in said background, a preexposure object, means for supporting said object at said point, a test object, means for substituting said test object for said preexposure object at said aperture, the visual characteristics of said test object being so related to those of the preexposure object that the test object appears in its true visual characteristics free from any change due to an after image of the preexposure object.

6. An apparatus for testing central scotoma comprising an apertured plate, a fixation object on said plate for directing the eye of a patient toward said aperture, means for supporting a neutral plate at said aperture, said neutral plate having an aperture concentric with the aperture of the first-named plate, a preexposure object, means for supporting said preexposure object at the aperture of said neutral plate, a test object having visual characteristics so related to the visual characteristics of the preexposure object that the test object will appear in its true visual characteristics unaffected by any after image of the preexposure object, and means for substituting the test object for the preexposure object.

7. An apparatus for testing central scotoma comprising an apertured plate, a fixation object on said plate for directing the eye of a patient toward said aperture, means for supporting a neutral plate at said aperture, said neutral plate having an aperture concentric with the aperture of the first-named plate, a preexposure object having the same neutral brightness as said neutral plate, means for supporting said preexposure object at the aperture of said neutral plate, a test object having visual characteristics so related to the visual characteristics of the preexposure object that the test object will appear in its true visual characteristics unaffected by any after image of the preexposure object, and means for substituting the test object for the preexposure object.

CLARENCE ERROL FERREE.
GERTRUDE RAND FERREE.